United States Patent
Loscalzo

(10) Patent No.: US 9,607,653 B2
(45) Date of Patent: Mar. 28, 2017

(54) APPARATUS, SYSTEM AND METHOD OF AUTHOMATICALLY CREATING AN AGE PROGRESSION VIDEO

(71) Applicant: Synchronoss Technologies, Inc., Bridgewater, NJ (US)

(72) Inventor: Thomas P. Loscalzo, Stewartsville, NJ (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 0 days.

(21) Appl. No.: 14/855,038

(22) Filed: Sep. 15, 2015

(65) Prior Publication Data

US 2016/0104509 A1    Apr. 14, 2016

Related U.S. Application Data

(60) Provisional application No. 62/062,668, filed on Oct. 10, 2014.

(51) Int. Cl.
| | |
|---|---|
| *G11B 27/034* | (2006.01) |
| *G06K 9/00* | (2006.01) |
| *G11B 27/031* | (2006.01) |
| *G11B 27/28* | (2006.01) |
| *G06F 17/30* | (2006.01) |

(52) U.S. Cl.
CPC ........ *G11B 27/034* (2013.01); *G06F 17/3028* (2013.01); *G06F 17/30256* (2013.01); *G06K 9/00288* (2013.01); *G11B 27/031* (2013.01); *G11B 27/28* (2013.01); *G06K 2009/00322* (2013.01)

(58) Field of Classification Search
None
See application file for complete search history.

(56) References Cited

U.S. PATENT DOCUMENTS

| | | | | |
|---|---|---|---|---|
| 2006/0268183 | A1* | 11/2006 | Dunko | H04M 1/72544 348/751 |
| 2007/0230799 | A1* | 10/2007 | Shniberg | G06F 17/30259 382/224 |
| 2010/0281375 | A1* | 11/2010 | Pendergast | G11B 27/034 715/723 |
| 2014/0099029 | A1* | 4/2014 | Savvides | G06K 9/481 382/197 |

(Continued)

*Primary Examiner* — Eileen Adams
(74) *Attorney, Agent, or Firm* — Synchronoss Technologies, Inc.; Frederick W. Dour

(57) ABSTRACT

Embodiments of the present invention relate to a media processing engine that produces an age progression video of a person by using photos of the person. The processing engine sequences and manipulates the photos such that the focus in each chronological photo is on the person. The processing engine uses a sliding window for facial recognition across a wide age range such that pictures of the person at a younger age (e.g., infancy) are positively associated with pictures of the person at an older age (e.g., teenager). In some embodiments, the processing engine is implemented on a remote server that provides a backup or storage service to its members. The photos are located at the remote server. The age progression video can be downloaded and/or shared by a member with others. In some embodiment, the age progression video includes a text caption, such as a message promoting the service.

19 Claims, 3 Drawing Sheets

(56) References Cited

U.S. PATENT DOCUMENTS

2014/0282089 A1* 9/2014 West ............... H04L 65/403
                                                  715/753
2016/0125470 A1* 5/2016 Myers ............. G06Q 30/0269
                                                  705/14.66

* cited by examiner

APPARATUS, SYSTEM AND METHOD OF AUTOMATICALLY CREATING AN AGE PROGRESSION VIDEO

RELATED APPLICATIONS

This application claims benefit of priority under 35 U.S.C. section 119(e) of the U.S. Provisional Patent Application Ser. No. 62/062,668, filed Oct. 10, 2014, entitled "Automatic Creation of Age Progression Video with Option Viral Marketing Features," which is hereby incorporated by reference in its entirety.

FIELD OF INVENTION

The present invention relates to image processing. More particularly, the present invention relates to an apparatus, system and method of automatically creating an age progression video.

BACKGROUND OF THE INVENTION

People can have stored on one or more end-user devices numerous photos over a period of time. Photo albums or slideshows of digital photos are known for providing enjoyment to viewers. Collections of photos that contain emotionally potent content generate interest and are likely to be shared with others.

BRIEF SUMMARY OF THE INVENTION

Embodiments of the present invention relate to a media processing engine that produces an age progression video of a person by using photos of the person. The processing engine sequences and manipulates the photos such that the focus in each chronological photo is on the person. The processing engine uses a sliding window for facial recognition across a wide age range such that pictures of the person at a younger age (e.g., infancy) are positively associated with pictures of the person at an older age (e.g., teenager). In some embodiments, the processing engine is implemented on a remote server that provides a backup or storage service to its members. The photos are located at the remote server. The age progression video can be downloaded and/or shared by a member with others. In some embodiment, the age progression video includes a text caption, such as a message promoting the service.

In one aspect, a system for automatically creating age progression videos is provided. The system includes at least one storage storing photos and a server communicatively coupled with the at least one storage. The server is configured to identify all pictures of a subject from the photos in the at least one storage, identify a subset of the pictures for age progression based on a plurality of criteria, process the subset of pictures, and produce a video using all processed pictures in the subset.

In some embodiments, the system also includes an end-user device, wherein the photos are uploaded from the end-user device to the server for storage as part of a backup process initiated by a user of the end-user device.

In some embodiments, the server implements a facial recognition algorithm to analyze the photos to thereby identify photos which contain images of the same person and generate a ranked list of unidentified individuals based on how many times that person appears in the user's photos.

In some embodiments, the subject is user-selected. Alternatively, the subject is server-selected.

In some embodiments, the server implements a sliding time window for facial recognition of the subject in the photos such that pictures of the subject at a younger age are positively associated with pictures of the subject at an older age. In some embodiments, the sliding time window starts at a first time period to identify the subject in a first group of the photos that is associated with the first time period and slides in time to a second time period that partially overlaps with the first time period to identify the subject in a second group of photos that is associated with the second time period.

In some embodiments, the sliding window slides backwards in time such that the first time period is more recent than the second time period. In some embodiments, the sliding window slides forwards in time such that the first time period is earlier than the second time period. In some embodiments, the sliding time window concurrently slides backwards and forwards in time.

In some embodiments, the plurality of criteria includes qualitative and temporal criteria.

In some embodiments, the subset of pictures includes more pictures of the subject at a first age than pictures of the subject at a second age, wherein the first age is smaller than the second age. In some embodiments, the temporal selection criteria includes a targeted number of images for specific age ranges.

In some embodiments, the subset of pictures is processed by aligning each in the subset with others in the subset, cropping each in the subset based on the alignment, adjusting each in the subset for exposure, focus, lighting, color balance or a combination thereof, scaling each in the subset to a target spacial resolution, and filing each in the subset to achieve a target aspect ratio.

In some embodiments, the video includes a viral marketing element.

In some embodiments, the at least one storage is co-located with the server. Alternatively, the at least one storage is native to an end-user device.

In another aspect, a computing device is provided. The computing device includes a media processing engine. The media processing engine is configured to use a sliding time window for facial recognition of a subject in a collection of photos such that pictures of the subject at a younger age are positively associated with pictures of the subject at an older age. The sliding window starts at a first time period in a time range such that the media processing engine first identifies the subject in a first group of the photos that is associated with the first time period, and wherein the sliding window after the first identification slides in time to a second time period in the time range to identify the subject in a second group of the photos that is associated with the second time period.

In some embodiments, the collection of photos is taken over the time range.

In some embodiments, the first time period partially overlaps with the second time period.

In some embodiments, the sliding time window is date-based, age-estimate-based or a combination thereof.

In yet another aspect, a method of automatically creating age progression videos is provided. The method includes accessing by a server photos from at least one storage, identifying by the server all pictures of a subject from the photos in the at least one storage, identifying by the server a subset of the pictures for age progression based on a plurality of criteria, processing by the server the subset of pictures, and producing by the server a video using all processed pictures in the subset.

In some embodiments, the method also includes implementing by the server a sliding time window for facial recognition of the subject in the photos such that pictures of the subject at a younger age are positively associated with pictures of the subject at an older age.

In some embodiments, the sliding time window starts at a first time period to identify the subject in a first group of the photos that is associated with the first time period and slides in time to a second time period that partially overlaps with the first time period to identify the subject in a second group of photos that is associated with the second time period.

In some embodiments, the step of processing the subset of pictures includes aligning each in the subset with others in the subset, cropping each in the subset based on the alignment, adjusting each in the subset for exposure, focus, lighting, color balance or a combination thereof, scaling each in the subset to a target spacial resolution, and filing each in the subset to achieve a target aspect ratio.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the present invention relate to a media processing engine that produces an age progression video of a person by using photos of the person. The processing engine sequences and manipulates the photos such that the focus in each chronological photo is on the person. The processing engine uses a sliding window for facial recognition across a wide age range such that pictures of the person at a younger age (e.g., infancy) are positively associated with pictures of the person at an older age (e.g., teenager). In some embodiments, the processing engine is implemented on a remote server that provides a backup or storage service to its members. The photos are located at the remote server. The age progression video can be downloaded and/or shared by a member with others. In some embodiment, the age progression video includes a text caption, such as a message promoting the service.

Figure 1:
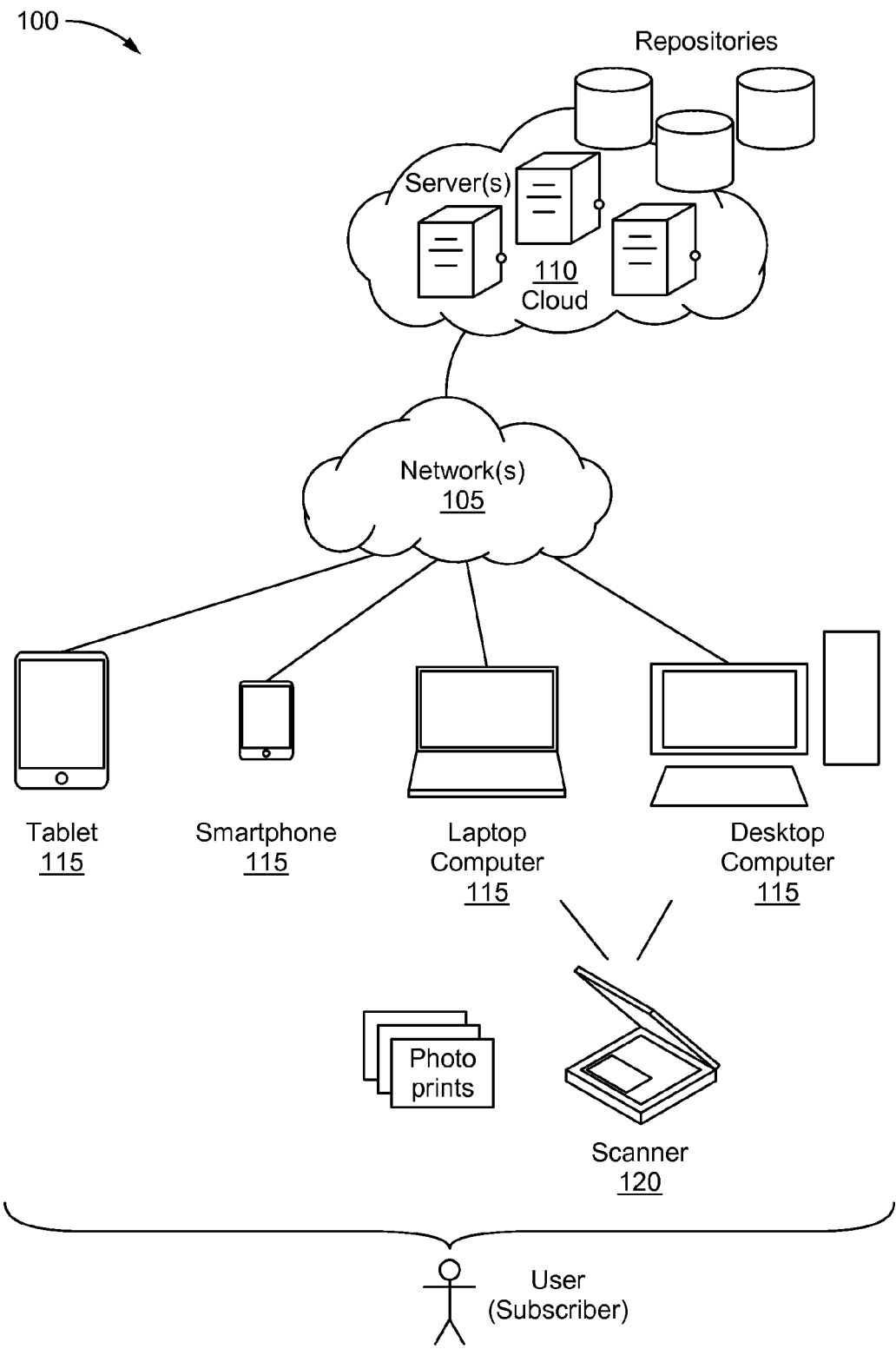
FIG. 1 illustrates an exemplary system according to some embodiments.

FIG. 1 illustrates an exemplary system 100 according to some embodiments. The system 100 typically includes a network(s) 105, such as the Internet, and a service cloud 110 that is communicatively coupled with one or more end-user devices 115 via the network 105. A server(s) in the cloud 110 provides a service to its subscribers. Each of the end-user devices 115 is able to access the server(s) therefrom by using a web browser and/or a client program. Assume for purposes of discussion herein that all of the end-user devices 115 belong to a single subscriber of the service.

In some embodiments, the service includes a backup or storage feature that is configured to back up data, such as photos, music, address books, videos, etc., from any or all of the subscriber's end-user device(s) 115 such that backed up data can at transferred from one end-user device to another end-user device via the server(s) in the cloud 110. The backed up data from the end-user devices 115 are stored in one or more repositories. The one or more repositories can be located in the cloud 110, as illustrated in FIG. 1, although the repositories can be located elsewhere in the system 100 as long as the repositories are accessible by the cloud server(s).

In some embodiments, the service also includes a video generation feature that automatically creates age progression videos for its subscribers. In some embodiments, the video generation feature is implemented by a media processing engine in the cloud server(s). In some embodiments, the media processing engine is configured to identify a person for creating a video of, identify the best pictures of the person from the backed up photos in the cloud 110, process the identified pictures, and produce a video using the processed pictures. In some embodiments, depending on the subscriber's service, the video generation feature can create a plurality of age progression videos of the same person, each at different periods of the person's life or each showing a different emotion the person is showing, etc., for the subscriber. In some embodiments, depending on the subscriber's service, the video generation feature can create a plurality of age progression videos of different people for the subscriber.

The service can require the subscriber to have an account in the cloud 110. The account allows the subscriber to set preferences, such as frequency of backups, notifications and information sharing settings, and to upgrade their service subscription in order to access additional aspects of the different features provided by the service. The subscriber is able to access their account to view personal data (e.g., the backed up data, such as photos, or one or more age progression videos) stored in their account in the cloud 110 via a web page or a client program installed on an end-user device 115. Likewise, the subscriber is able to upload data to their account in the cloud 110 from any one of the end-user devices 115. For example, the subscriber is able to upload all photos stored on the smart phone or tablet or laptop computer to the cloud 110.

In instances where the subscriber has photo prints that the subscriber would like to upload to the cloud 110, the subscriber is able to digitalized the photo prints using a scanner 120 coupled to an end-user device 115 and, thereafter, upload the digitalized photos to their account in the cloud 110. Although the scanner 120 is shown to be communicatively coupled to the laptop computer and the desktop computer, the scanner 120 can be communicatively coupled to any one or more of the end-user devices 115. Alternatively or in addition to, the subscriber is able to take a digital photograph of each photo print, such as from a native camera of an end-user device, and thereafter upload the digitalized photos to their account in the cloud 110.

Figure 2:
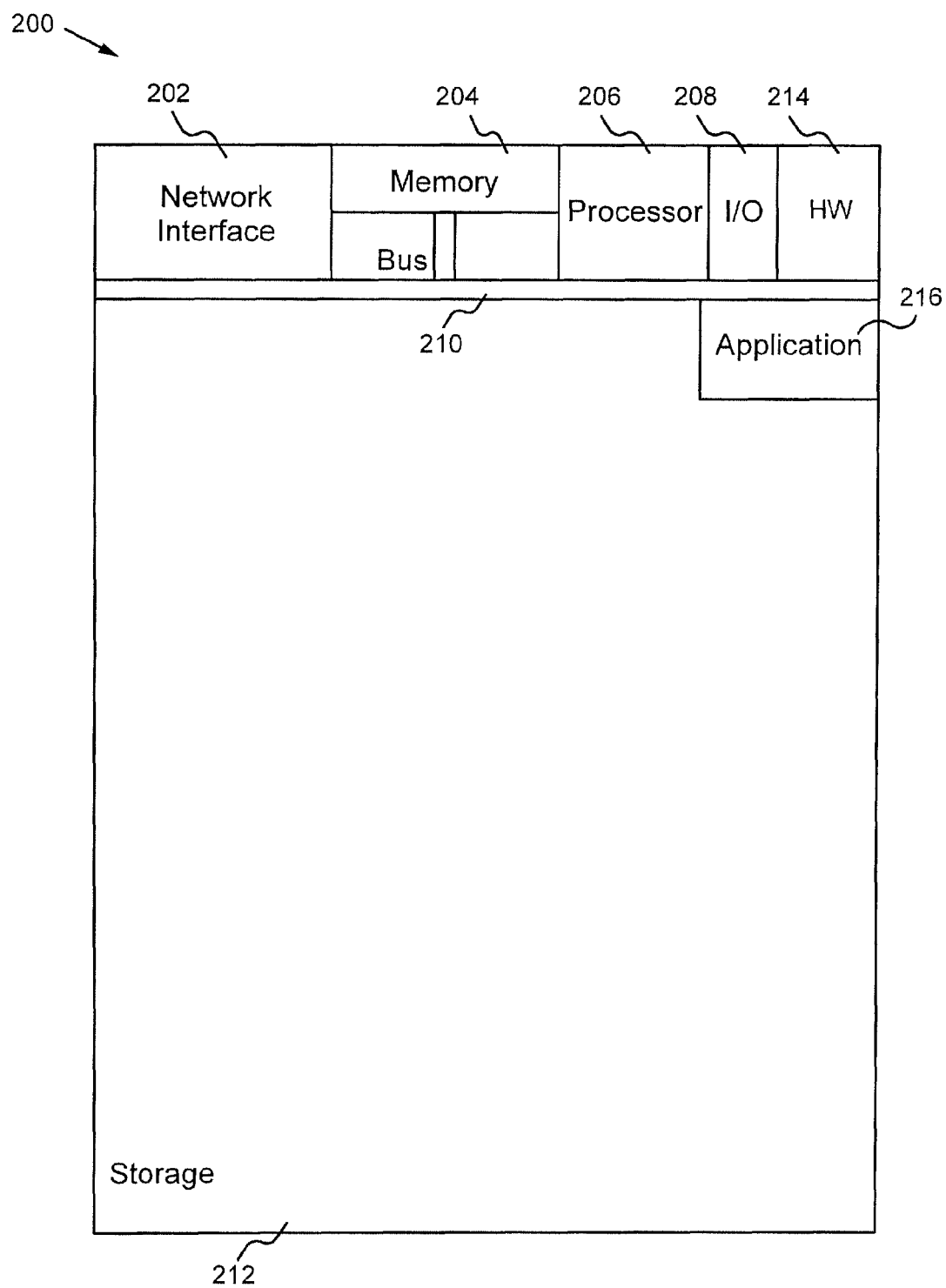
FIG. 2 illustrates a block diagram of an exemplary computing device according to some embodiments.

FIG. 2 illustrates a block diagram of an exemplary computing device 200 according to some embodiments. The computing device 200 is able to be used to acquire, cache, store, compute, search, transfer, communicate and/or display information. The server(s) in the cloud 110 and/or the end-user devices 115 of the FIG. 1 can be similarly configured as the computing device 200.

In general, a hardware structure suitable for implementing the computing device 200 includes a network interface 202, a memory 204, processor(s) 206, I/O device(s) 208, a bus 210 and a storage device 212. The choice of processor 206 is not critical as long as a suitable processor with sufficient speed is chosen. In some embodiments, the computing device 200 includes a plurality of processors 206. The memory 204 is able to be any conventional computer memory known in the art. The storage device 212 is able to include a hard drive, CDROM, CDRW, DVD, DVDRW, flash memory card, RAM, ROM, EPROM, EEPROM or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. Application(s) 214, such as the client program or one or more server side applications implementing the service discussed above, are likely to be stored in the storage device 212 and memory 204 and are processed by the processor 206. More or less components or modules shown in FIG. 2 are able to be included in the computing device 200. For example, the computing device 200 can include the media processing engine and an interface module. As discussed elsewhere, the media processing engine is configured to identify a person for whom to create a video, identify the best pictures of the person, process the identified pictures, and produce a video using the processed pictures. As discussed elsewhere, the interface module includes at least one user interface (UI) that is accessible by the subscriber to access personal data associated with their account in the cloud.

The computing device 200 can be a server or an end-user device. Exemplary end-user devices include, but are not limited to, a tablet, a mobile phone, a smart phone, a smart watch, a desktop computer, a laptop computer, a netbook, or any suitable computing device such as special purpose devices, including set top boxes and automobile consoles.

Figure 3:
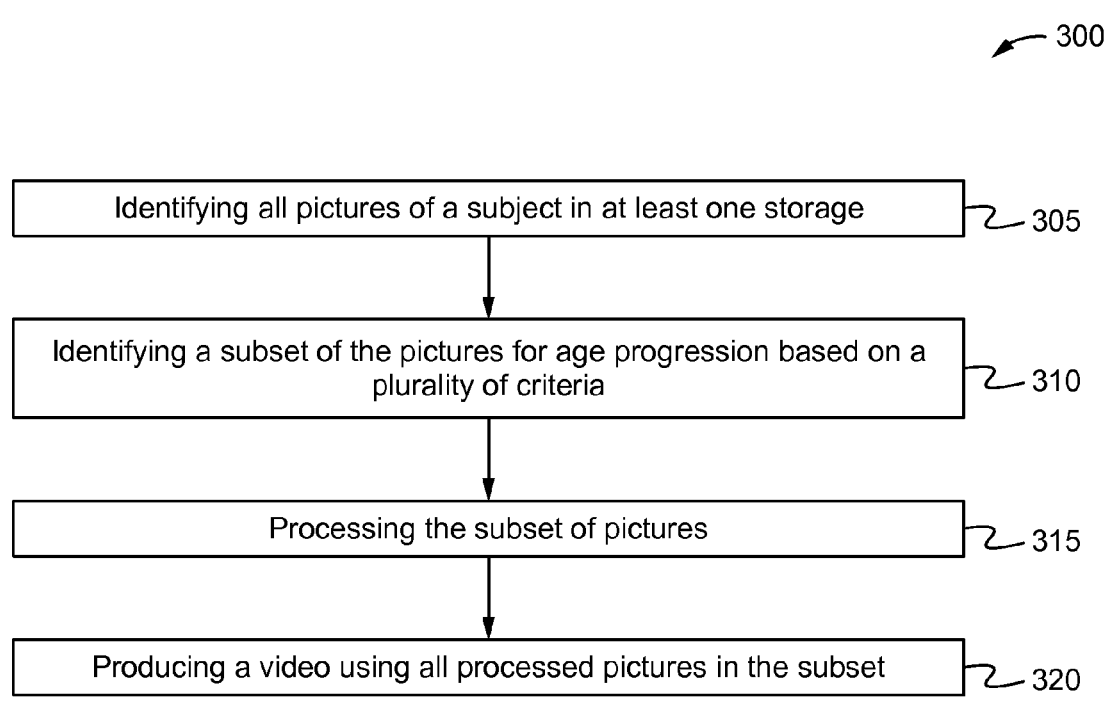
FIG. 3 illustrates an exemplary method of automatically creating an age progression video at a server according to some embodiments.

FIG. 3 illustrates an exemplary method 300 of automatically creating an age progression video at a server according to some embodiments. Assume the server, such as the server of FIG. 1, has access to backed up photos in cloud repositories and/or photos stored on one or more end-user devices belonging to a user, who is a subscriber, to create the age progression video from. In some embodiments, the server also has access to remote locations that the user has photos stored at, such as social media sites. In some embodiments, the user provides the server with login information to these sites in the user's account in the cloud. All of the photos the server has access to are referred to as the user's photos.

At a step 305, the server identifies all pictures of a subject from the user's photos. In some embodiments, the subject can be selected by the user. The identity of the subject can be provided by the user via submitting a photo of the subject to the server, or via clicking on the subject in one of the user's photos or from a server-generated list of subjects. Alternatively or in addition to, the subject can be automatically selected by the server. In some embodiments, a media processing engine of the server uses a facial recognition algorithm to analyze the user's photos to identify "clusters" of photos which contain images of the same person, and generate a ranked list of unidentified individuals based on how many times that person appears in the user's photos.

In some embodiments, the media processing engine of the server determines a cutoff point based on one of more criteria including, but not limited to, (1) an absolute number of times that a person appears in the user's photos, (2) the top N people who appear most frequently in the user's photos, (3) people that appear over a minimum time frame and/or a certain frequency within that time range, such as every person who appears at least once every three months over a period of at least two years, (4) people who appear in the user's photos with a certain minimum quality standard, such as only people who are smiling, looking at the camera, in focus, with eyes open and no redeye, and (5) background criteria to achieve a certain target aspect ratio, such as only include pictures where the person's entire torso is visible in, for example, a 16:9 aspect ratio but no other people or portion(s) of people are visible within that aspect ratio.

The subject can be selected by the media processing engine of the server from the ranked list. In some embodiments, the subject is the highest ranked in the list of unidentified individuals. In some embodiments, the subject is in the photos spanning the greatest amount of time (e.g., infant to adulthood). In some embodiments, the server-generated list of subjects can include at least a portion of the ranked list for the user to select a candidate from.

The media processing engine of the server uses a configurable sliding time window for facial recognition across a wide age range such that pictures of a person at a younger age (e.g., infancy) are positively associated with pictures of the person at an older age (e.g., teenager). The sliding window is configured with a configurable time period of, for example, six months, to positively identify the person in the most recent photos taken within six months of each other, based on photo date. The time window then slides backwards and/or forwards, for example, a few months. The media processing engine uses the six months of positive identification of the person to identify the person in the three months of unknown. The time window continually slides or moves backwards and/or forwards in time to associate older pictures with newer pictures.

In some embodiments, the photo date can be determined using one or more of the following methods: (1) file system attributes (e.g., date image file was created on a computer), (2) EXIF/embedded attributes (e.g., date image taken, which can be populated by a camera), and (3) subject age estimates as determined by a face detection algorithm. In some embodiments, the face detection algorithm is provided by a face detection/recognition engine that is configured to estimate age, sex and other attributes of each person in an image. In some embodiments, the face detection algorithm requires at least one image of a subject where the subject's age is known. The face detection algorithm would then compare the at least one image with all images containing someone +/−X years (e.g., X=5) as old as the subject. Then, the sliding time window works on the facial recognition engine estimated age as opposed to the actual image capture or record date. The third method is useful as some images do not have accurate timestamps. The sliding time window thus can be date-based, age-estimate-based, or a combination thereof.

The window can slide backward in time as it can easier to identify a person at an older age than it is to identify the person at a younger age. When a person becomes 17 or 18 years of age, the person's face typically does not change as much. The window can also slide forward in time if the media processing engine determines that it can better identify a person at a younger age than it can of the person at an older age. The window can slide backward and/or forward in depending on the known or estimated age of the subject in a photo submitted by the user.

Once the person is identified in pictures taken within six months of each other, the window slides backwards or forwards another three months to find pictures of the same person when the age difference is not great. This sliding window advantageously minimizes error in recognizing the subjects in the photos since the server is not trying to match a picture of a 12 year old child with a picture with a 12 month old infant but instead is always looking at pictures that are chronologically close. Put differently, the media processing engine compares a first set of pictures associated with a first time range with a second set of pictures associated with a second time range, then the second set of pictures with a third set of pictures associated with a third time range, and so forth, wherein the time ranges are chronological. In some embodiments, the first time range is the most recent in time as compared with the subsequent time ranges. Alternatively, the first time range is the earliest in time as compared with the subsequent time ranges. Alternatively, the first time range is neither the most recent nor the earliest in time as compared with the subsequent time ranges. In some embodiments, each time range partially overlaps with another time range. As the window slides, the media processing engine is likely to correctly identify the same person through their lifetime.

After all pictures of the subject are identified, at a step 310, the server identifies a subset of the pictures for age progression based on one or more criteria. The criteria can be pre-configured and/or can be configurable/selectable by the user via the user's account. The identification of the subset is both qualitative and temporal. The media processing engine of the server is able to identify the subset of the pictures and to determine what is the optimal temporal spacing for the given subset of pictures. The one or more criteria include, but not limited to, (1) quality based on image focus, visual focus on camera, obstruction of face, lighting, colors, facial expression (e.g., smile or frown), clothing or accessories, facial resolution (e.g., total number of pixels and color depth or precision of pixels within the boundaries of the subject's face), facial adornments (e.g., glasses, earrings, hair styles, retainers, makeup or facial hair) and the like, (2) a targeted temporal spacing, such as one photo per month, or every two months, or every quarter, or every year, and (3) images that naturally "cluster" together based on photographic similarity among the images (e.g., lighting, backgrounds, colors, clothing, hair styles, facial expression, camera and lens settings, capabilities, and parameters), artistic qualities, portions of the face and/or body shown (e.g., face, neck, torso, or full body), body poses or orientation towards the camera and the like.

The temporal spacing can be system-defined or user-defined. In some embodiments, more pictures of the subject at a younger age are selected than pictures of the subject at an older age since the aging process is more pronounced when people are younger and less so over time. For example, with a newborn, weekly pictures until they are six weeks old are selected. Then, biweekly pictures until they are three months old are selected. Then, monthly pictures until they are one and half years old are selected. Then, bimonthly pictures until they are five years old, and so forth.

Once the subset of the pictures is identified, at a step 315, the server processes the subset of the pictures. In some embodiments, for each picture in the subset, the picture is first aligned and cropped around a bounding box showing either the boundaries of the subject's face, a "portrait" bounding box showing next and shoulders, torso, full standing pose, or a superset of any of these areas to achieve a target aspect ratio and/or consistent size and position of the subject across the pictures in the subset such that the subject's face is not jumping around in a video eventually created in a latter step of the method 300. The picture is then adjusted for exposure, focus, lighting, color balance or other photographic adjustments. Next, the picture is scaled to a target spacial (pixel) resolution using a scaling algorithm including, but not limited to, linear scaling, bicubic scaling or other scaling algorithm techniques. Thereafter, the picture is filled to achieve a target aspect ratio and/or adjusted to lend focus to the subject using a filling algorithm including, but not limited to, background blurring, background averaging, fixed color or other filling algorithm techniques.

At a step 320, the server produces a video using all processed or adjusted pictures in the subset. The media processing engine of the server assembles all the adjusted pictures into a video. The adjusted pictures are displayed in chronological order. In some embodiments, photo metadata including, but not limited to, file timestamps and EXIF timestamps, is used to chronologically sequence the adjusted pictures. Alternatively, the adjusted pictures are displayed in any other sequence, such as a reverse chronological order.

In some embodiments, each adjusted picture can display the date/time associated with it. In some embodiments, the video can include one or more transition techniques between the adjusted pictures. The transition techniques include, but are not limited to, appear and disappear, fade in and out, fly in and out and checkerboard. In some embodiments, the video can include a header, footer or intermediate frames showing server-generated content. The server-generated content includes, but is not limited to, captions, other photos or videos, crossfaded (translucent or transparent) photos or videos, text "billboards" or messages, html hyperlinks (clickable or static), and other suitable contents. In some embodiments, the video can be accompanied with sentimental music. Depending on the user's subscription service, the user can select the accompanying music from the user's backed up music.

In some embodiments, the video will include a viral marketing element. For example, the beginning, the middle or the end of the video or a "static image" in the video will be youngest available image in the image sequence since people are naturally drawn to older photos showing subjects at younger ages. For another example, the video will include other image or text with "viral" or compelling attributes including, but not limited to, content that evokes strong emotions along one or more emotional dimensions, and/or a text caption. The text caption can include, but is not limited to, promotional messages associated with the age progression video feature, promotional messages associated with the service provider or its other products, logo or brand of the service provider, invitation to try its service, invitation to learn about its service through any means such as clickable html link or web address, invitation to create additional videos by unloading images from other end-user devices, invitation to share the video with others through email, SMS, social media or other means, and invitation to edit/modify the video to fit a certain format, time range, length, transition style, or other attribute of the video, such as a 7-second "vine video," an automated GIF, a 30-, 60-, 90- or 120-second version of the video, a high resolution video for archiving, or a mobile format video for convenient sharing through mobile technology.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

I claim:

1. A system for automatically creating age progression videos, the system comprising:
　at least one storage storing photos; and
　a server communicatively coupled with the at least one storage and configured to create an age progression video of a person by using only photos that include that person, wherein the age progression video is created by:
　　automatically identifying all pictures of the person from the photos in the at least one storage;
　　automatically identifying a subset of the pictures of the person based on a plurality of criteria;
　　processing the subset of pictures such that at least one characteristic of a portion of each processed picture that shows the person is consistent across all processed pictures; and
　　producing the video using all of the processed pictures,
　wherein the server implements a sliding time window for facial recognition of the person in the photos such that pictures of the person at a younger age are positively associated with pictures of the person at an older age.

2. The system of claim 1, further comprising an end-user device, wherein the photos are uploaded from the end-user device to the server for storage as part of a backup process initiated by a user of the end-user device.

3. The system of claim 1, wherein the server implements a facial recognition algorithm to analyze the photos to thereby identify photos which contain images of the same person and generate a ranked list of unidentified individuals based on how many times that person appears in the user's photos.

4. The system of claim 1, wherein the person is user-selected.

5. The system of claim 1, wherein the person is server-selected.

6. The system of claim 1, wherein the sliding time window starts at a first time period to identify the person in a first group of the photos that is associated with the first time period and slides in time to a second time period that partially overlaps with the first time period to identify the person in a second group of photos that is associated with the second time period.

7. The system of claim 6, wherein the sliding time window slides backwards in time such that the first time period is more recent than the second time period.

8. The system of claim 6, wherein the sliding time window slides forwards in time such that the first time period is earlier than the second time period.

9. The system of claim 6, wherein the sliding time window concurrently slides backwards and forwards in time.

10. The system of claim 6, wherein the plurality of criteria Includes qualitative and temporal criteria.

11. The system of claim 10, wherein the subset of pictures includes more pictures of the person at a first age than pictures of the person at a second age, wherein the first age is smaller than the second age, wherein the temporal selection criteria includes a targeted number of images for specific age ranges.

12. The system of claim 11, wherein the subset of pictures is processed by:
　aligning each in the subset with others in the subset;
　cropping each in the subset based on the alignment;
　adjusting each in the subset for exposure, focus, lighting, color balance or a combination thereof;
　scaling each in the subset to a target spacial resolution; and
　filing each in the subset to achieve a target aspect ratio.

13. The system of claim 10, wherein the video includes a viral marketing element.

14. The system of claim 13, wherein the at least one storage is co-located with the server.

15. The system of claim 14, wherein the at least one storage is native to an end user device.

16. A computing device comprising a media processing engine, wherein the media processing engine is configured to use a sliding time window for facial recognition of a person in a collection of photos to thereby identify pictures of the person from the collection of photos such that identified pictures of the person at a younger age are positively associated with identified pictures of the person at an older age, wherein the sliding window starts at a first time period in a time range such that the media processing engine first identifies the person in a first group of the photos that is associated with the first time period, wherein the collection of photos is taken over the time range, wherein the sliding window after the first identification slides in time to a second time period in the time range to identify the person in a second group of the photos that is associated with the second time period, wherein the first time period partially overlaps with the second time period, and wherein the sliding time window is date based, age-estimate-based or a combination thereof.

17. A method of automatically creating an age progression videos of a person by using only photos that include that person, the method comprising:
　accessing by a server photos from at least one storage;
　automatically identifying by the server all pictures of the person from the photos in the at least one storage;
　automatically identifying by the server a subset of the pictures of the person based on a plurality of criteria;
　implementing by the server a sliding time window for facial recognition of the person in the photos such that pictures of the person at a younger age are positively associated with pictures of the person at an older age;
　processing by the server the subset of pictures such that at least one characteristic of a portion of each processed picture that shows the person is consistent across all processed pictures; and
　producing by the server the video using all of the processed pictures, wherein the processed pictures are ordered to show the age progression of the subject from a first point in time associated with the first processed picture in the order to a second point in time associated with the last processed picture in the order.

18. The method of claim 17, wherein the sliding time window starts at a first time period to identify the person in a first group of the photos that is associated with the first time period and slides in time to a second time period that partially overlaps with the first time period to identify the person in a second group of photos that is associated with the second time period.

19. The method of claim 18, wherein processing the subset of pictures includes:
   aligning each in the subset with others in the subset;
   cropping each in the subset based on the alignment;
   adjusting each in the subset for exposure, focus, lighting, color balance or a combination thereof;
   scaling each in the subset to a target spacial resolution; and
   filing each in the subset to achieve a target aspect ratio.

* * * * *